United States Patent [19]

Baba et al.

[11] Patent Number: 4,678,899
[45] Date of Patent: Jul. 7, 1987

[54] AFOCAL VARIABLE MAGNIFICATION OPTICAL SYSTEM

[75] Inventors: Takeshi Baba, Yokohama; Shigeyuki Suda, Tokyo, both of Japan

[73] Assignee: Canon Kabushiki Kaisha, Tokyo, Japan

[21] Appl. No.: 780,577

[22] Filed: Sep. 26, 1985

[30] Foreign Application Priority Data

Sep. 28, 1984 [JP] Japan ............... 59-203612

[51] Int. Cl.⁴ ................ G01J 1/20; G02B 3/00
[52] U.S. Cl. ......................... 230/201; 350/453
[58] Field of Search ............ 250/201; 350/418, 419, 350/453

[56] References Cited

U.S. PATENT DOCUMENTS 4,460,251 7/1984 Okudaira ............... 350/453
4,469,396 9/1984 Neil ..................... 350/453
4,477,158 10/1984 Pollock et al. ........... 350/149

*Primary Examiner*—Gene Wan
*Attorney, Agent, or Firm*—Fitzpatrick, Cella, Harper & Scinto

[57] ABSTRACT

An afocal variable magnification optical system has a first optical system having at least one variable refracting power element; and a second optical system.

13 Claims, 6 Drawing Figures

AFOCAL VARIABLE MAGNIFICATION OPTICAL SYSTEM

BACKGROUND OF THE INVENTION

The present invention relates to a variable magnification optical system and, more particularly, to an afocal variable magnification optical system.

In conventional variable magnification optical systems, in order to keep a focusing surface at a constant position during a magnification varying operation, at least two lens groups must be moved along an optical axis. For this reason, the two lens groups must be spaced apart exceeding a constant distance so as not to collide with each other. Due to this requirement, the lens system cannot be rendered compact. In addition, since at least one lens group must be nonlinearly moved, an expensive moving mechanism is required.

In particular, in order to constitute an afocal variable magnification optical system, at least one lens group is required, in addition to the two moving lens groups. When the afocal optical system is constituted by two lens groups, an image space focal point of a lens group at the side of an image and an object focal point of a lens group at the side of an image must coincide with each other, and magnification cannot be varied by movement of the lens groups. For this reason, in order to realize a conventional afocal variable magnification optical system which keeps the focusing surface at a constant position, for example, as described in Japanese Patent Laid-Open No. 149915/1980, a first moving lens group for varying magnification, a second moving lens group for compensating for movement of an image position associated with a variation in magnification and a third lens group for converting the overall system into an afocal system are needed. Therefore, as compared to a focal variable magnification optical system, an afocal variable magnification optical system becomes expensive, and an extra space is required, thus preventing a compact system.

SUMMARY OF THE INVENTION

It is an object of the present invention to provide a simple, low-price, compact afocal variable magnification optical system free from the drawbacks of the prior art.

In order to achieve the above object, in a variable magnification optical system according to the present invention, there is provided an afocal optical system comprising a lens group A having at least one variable refracting power element, and another lens group B.

DETAILED DESCRIPTION OF THE PREFERRED EMBODIMENTS

In general, in order to constitute an afocal optical system by two lens groups A and B having focal lengths $f_A$ and $f_B$, respectively, a distance e between the principal points of the lens groups A and B must satisfy $e = -f_A + f_B$. In this case, an angular magnification $\gamma$ viewed from the side of the lens group A of this afocal optical system is given by $\gamma = -f_A/f_B$.

Figure 1:
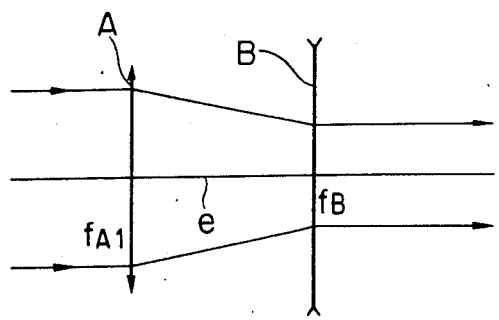
FIGS. 1 and 2 are illustrations showing a first basic arrangement of a variable magnification optical system according to the present invention.
Figure 2:
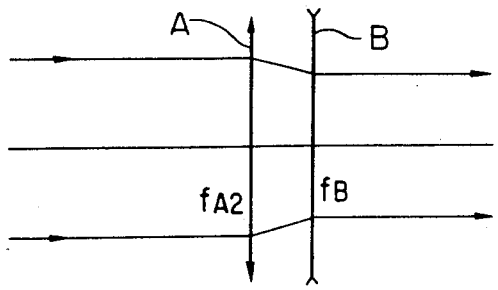

FIGS. 1 and 2 show a first basic arrangement of a variable magnification optical system according to the present invention. A lens group A including at least one variable refracting power element is arranged at the side of an object space (light incident side) and has a positive refracting power. A focal length $f_A$ of the lens group A can be varied within the range between $f_{A1}$ to $f_{A2}$ by changing the refracting power of the variable refracting power element. The lens group A is movable along the optical axis. A lens group B of a focal length $f_B$ is spatially fixed at the side of an image space (light output side) of the lens group A, and has a negative refracting power. Note that since the lens groups A and B need only be movable along the optical axis relative to each other, the lens group A can be fixed and the lens group B can be set to be movable.

FIG. 1 shows a normal state of the variable magnification optical system. The lens groups A and B constitute an afocal system wherein the focal length $f_A$ of the lens group A is set to be $f_A = f_{A1}$, a principal point distance e of the lens groups A and B is set to be $e = -f_{A1} + f_B$, and an angular magnification $\gamma$ is set to be $\gamma = -f_{A1}/f_B$.

FIG. 2 shows a magnification varying state of the variable magnification optical system shown in FIG. 1, wherein the focal length $f_A$ of the lens group A is changed from $f_{A1}$ to $f_{A2}$, and the lens group A is moved by $\Delta l = f_{A1} - f_{A2}$ toward the image space side along the optical axis from the normal state shown in FIG. 1. In the state shown in FIG. 2, a system comprising the lens groups A and B constitutes an afocal system, and the angular magnification $\gamma$ is changed to $\gamma = -f_{A2}/f_B$.

In this manner, the principal point distance e between the lens groups A and B is changed by moving the lens group A or B along the optical axis, and the refracting power of the variable refracting power element of the lens group A is changed so that the focal length of the lens group A yields $f_A = e - f_B$, thus realizing an afocal variable magnification optical system whose angular magnification can be continuously varied within the range between $-f_{A1}/f_B$ and $-f_{A2}/f_B$.

Note that FIGS. 1 and 2 show the case of $f_{A1} > f_{A2} > f_B$.

Figure 3:
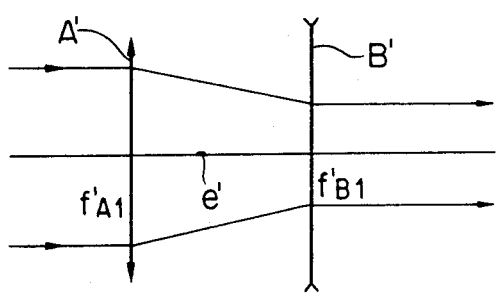
FIGS. 3 and 4 are illustrations showing a second basic arrangement of a variable magnification optical system according to the present invention.
Figure 4:
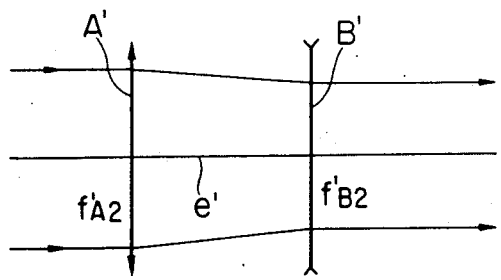

FIGS. 3 and 4 show a second basic arrangement of the variable magnification optical system of the present invention. Lens groups A' and B' are spatially fixed and have at least one variable refracting power element. The lens group A' is arranged at the side of an object space, and the lens group B' is arranged at the side of an image space. The lens groups A' and B' have a principal point distance e' therebetween. FIG. 3 shows a normal state of the variable magnification optical system. In this state, the lens groups A' and B' constitute an afocal system wherein a focal length $f'_A$ of the lens group A' is set to be $f'_A = f'_{A1}$, a focal length $f'_B$ of the lens group B' is set to be $f'_B = f'_{B1} = e' - f'_{A1}$, and an angular magnification $\gamma'_l$ is set to be $\gamma'_l = -f'_{A1}/f'_{B1} = -f'_{A1}/(e' - f'_{A1})$.

FIG. 4 shows a varying state wherein the focal length $f'_A$ of the lens group A' is changed to be $f'A = f'_{A2'}$ and the focal length $f'_B$ of the lens group B' is changed to be $f'_B = f'_{B2} = e' - f'_{A2}$ by changing the refracting power of the variable refracting power elements of the lens groups A' and B', respectively. In this case, a system comprising the lens groups A' and B' also constitutes an afocal system, and the angular magnification $\gamma'_2$ thereof is changed from the normal state to $\gamma'_2 = -f'_{A2}/f'_{B2} = -f'_{A2}/(e' - f'_{A2})$. In this mannger, when the focal length $f'_A$ of the lens group A' is changed and the focal length $f'_B$ of the lens group B' is changed with respect to the principal point distance e' so as to be $f'_B = e' - f'_A$, an afocal variable magnification optical system can be realized.

Tables 1 and 2 respectively show focal length ($f_A(f'_A)$, $f_B(f'_B)$), the principal point distance e (e') and the corresponding angular magnification $\gamma(\gamma')$ of the lens groups corresponding to the first and second basic arrangements of the embodiment.

Referring to Table 2, the principal point distance e' is constant, but in an actual optical system, even if the lens groups A' and B' are spatially fixed, e' is slightly changed in accordance with a change in refracting power of the variable refracting power element, and the values of $f'_A$ and $f'_B$ are different from those of Table 2. However, the values can be easily determined from the above description ($f'_B = e' - f_A$).

TABLE 1

| f A | f B | e | γ |
|-----|-----|-----|---|
| 125 | −25 | 100 | 5 |
| 100 | −25 | 75 | 4 |
| 75 | −25 | 50 | 3 |
| 50 | −25 | 25 | 2 |

TABLE 2

| f' A | f' B | e' | γ' |
|------|------|-----|-----|
| 100 | −25 | 75 | 4 |
| 112.5 | −37.5 | 75 | 3 |
| 150 | −75 | 75 | 2 |
| 0 | 0 | 75 | 1 |
| −75 | 150 | 75 | 0.5 |
| −37.5 | 112.5 | 75 | 0.333 |
| −25 | 100 | 75 | 0.25 |

The data in Table 3 represents an example of an afocal variable magnification optical system which varies its magnification in such a manner that refracting power of both of a lens group A having a positive refracting power and arranged at the side of an object space and a lens group B having a negative refracting power arranged at the side of an image space are changed and a principal point distance e between the lens groups A and B is changed.

TABLE 3

| f A | f B | e | γ |
|-----|-----|-----|---|
| 73.33 | −18.33 | 55 | 4 |
| 75 | −25 | 50 | 3 |
| 90 | −45 | 45 | 2 |

In the variable magnification optical system of the present invention, the variable refracting power element is used. However, from viewpoints of control of the change in refracting power and decrease in variation in abberation of the entire system, the change in refracting power of the variable refracting power element is preferably set to be as small as possible. Therefore, as in Table 1, when one lens group has a positive refracting power and the other has a negative refracting power, the variable refracting power element is preferably used in the lens group having the positive refracting power so as to suppress any change in refracting power.

In the second basic arrangement, as in Table 2, when the refracting power of one lens group is changed from a positive to negative value, the refracting power of the other lens group is changed from a negative to positive value, thereby obtaining a large variable magnification ratio with a short total length.

As shown in Table 3, even when the focal lengths $f_A$ and $f_B$ of the two lens groups and the principal point distance e are changed, the afocal variable magnification optical system can be easily obtained.

When an imaging lens group is arranged in front of or behind the afocal variable magnification optical system of the present invention, it can be easily converted into a focal variable magnification optical system.

Figure 5:
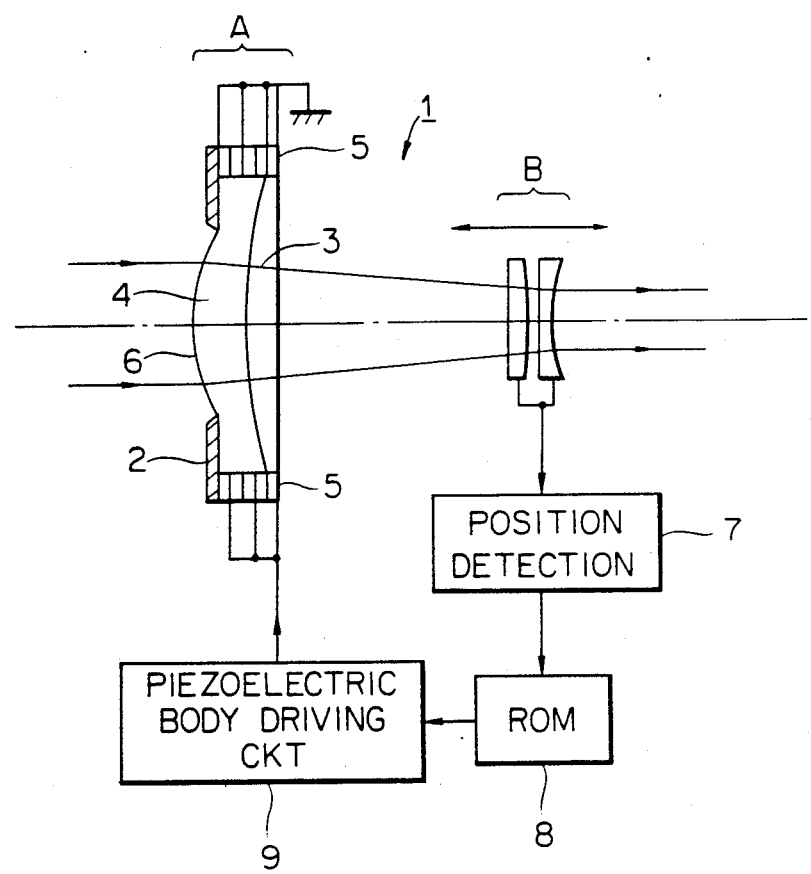
FIG. 5 is a view showing a first embodiment of the variable magnification system according to the present invention.

As a focusing method of the variable magnification optical system of the present invention, a method wherein refracting power of the variable refracting power element included in the lens group A or B is changed can be employed in addition to a method wherein the lens group A or B is entirely or partially moved along the optical axis FIG. 5 shows a detailed arrangement of the variable magnification optical system according to a first embodiment of the present invention. As the variable refracting power element used in the variable magnification optical system of the present invention, various elements are known. These elements can be applied to the variable magnification optical system of the present invention. However, in this case, descriptions will be made wherein an element disclosed in Japanese Patent Application No. 193868/1983 (corresponds to Japanese Patent Laid-Open No. 845021/1985) by the same applicant of the present invention is used. Referring to FIG. 5, a variable refracting power element 1 is disclosed in Japanese Patent Application No. 193868/1983, and comprises an aperture plate 2 having a circular aperture, a cylindrical tube 5 formed by stacking thin ring-shaped piezoelectric bodies, and a transparent elastic member 4 such as a gel-like silicon rubber sealed in an inner portion of the cylindrical tube 5. Note that a surface of the transparent elastic member 4 opposite to that contacting the aperture plate 2 is adhered to a glass lens 3 fixed to the cylindrical tube 5. The cylindrical tube 5 is extended/contracted along its axial direction by applying a voltage to the ring-shaped piezoelectric layer. Since the cylindrical tube 5, the aperture plate 2 and the glass lens 3 are adhered to each other, the aperture plate 2 compresses or releases the elastic member 4 in accordance with extension/contraction of the cylindrical tube 5. Thus, a surface 6 in the aperture of the aperture plate 2 is modified into a lens shape, and refracting power is changed depending upon a voltage applied to the piezoelectric layer. The elastic member lens basically comprises an elastic member and an aperture which can deform an optical surface by projecting or releasing the elastic member, and a large variation in refracting power can be obtained with small power. According to methods disclosed, e.g., in Japanese Patent Application Nos. 228692/1983 (corresponds to Japanese Patent Laid-Open No. 120301/1985) and 12489/1984 (corresponds to Japanese Patent Laid-Open No. 156003/1985), a shape of a lens surface can be either controlled to be semi-spherical or non-spherical. As disclosed in Japanese Patent Application No. 45/1984, (corresponds to Japanese Patent Laid-Open No. 14703/1985), an element which changes a distribution of a refractive index in a lens medium can be used.

Referring to FIG. 5, although the lens group A is constituted by the elastic member 4 and the glass lens 3, a lens group B is constituted only by normal glass lenses. The lens group B can be moved along the optical axis by, e.g., a helicoid, a linear motor or the like (not shown). A position detection means 7 comprises a potentiometer, a linear encoder or the like for detecting a position of the lens group B along the optical axis. A piezoelectric body driving circuit 9 controls a voltage to be applied to the piezoelectric layer constituting the cylindrical tube 5 in accordance with an input signal so as to deform the surface 6 of the elastic memebr 4. For each position of the lens group B, a nonvolatile memory (ROM) 8 supplies a signal to the piezoelectric body driving circuit 9 in accordance with prestored data so that the surface 6 of the elastic member 4 can have refracting power required for the lens groups A and B to constitute the afocal system. Therefore, even when the magnification is varied by moving the lens group B, the overall system can be kept afocal.

Figure 6:
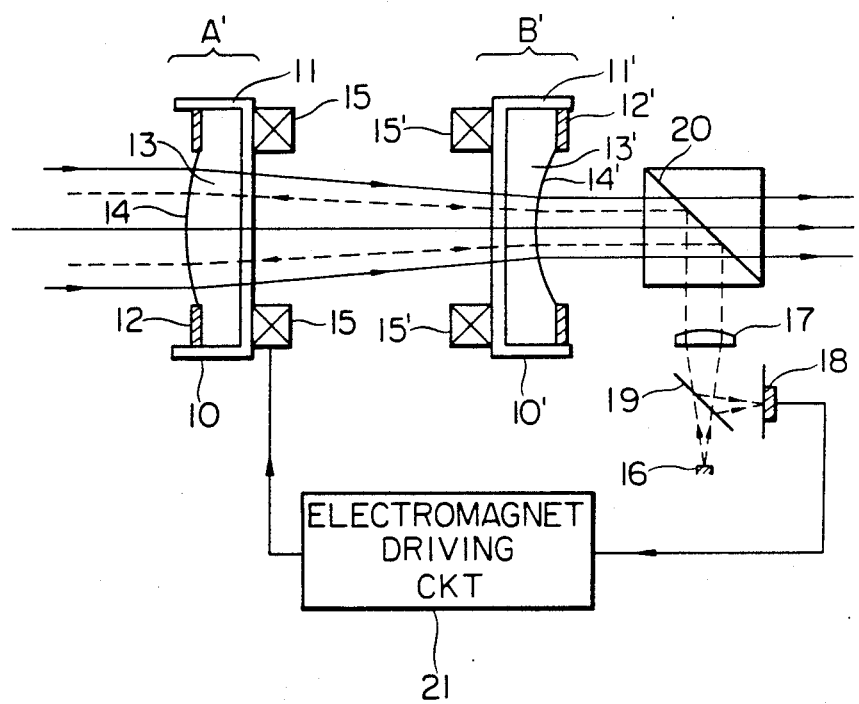
FIG. 6 is a view showing a second embodiment of the variable magnification system according to the present invention.

FIG. 6 shows a detailed arrangement of the variable magnification optical system according to the second embodiment of the present invention. Various refracting power elements 10 and 10' constitute lens groups A' and B', respectively. Elastic member 13 and 13' are housed in cylindrical housings 11 and 11'. Each of aperture plates 12 and 12' is made of a ferromagnetic body having a circular aperture, and the plates 12 and 12' are arranged in contact with the elastic members 13 and 13'. The aperture plates 12 and 12' can be moved in the housings 11 and 11' along the optical axis, and compress the elastic member 13 and 13' by moving along the optical axis by means of the attraction force of electromagnets 15 and 15'. Front surfaces 14 and 14' of the elastic members 13 and 13' respectively exposed through the apertures of the aperture plates 12 and 12' are deformed into a lens shape by compression of the aperture plates 12 and 12', thus changing their refracting powers. In particular, the surface 14' is formed in advance to have a concave surface in the non-compressed state. The variable refracting power element 10' changes its refracting power in accordance with a current supplied to the electromagnet 15', thereby changing a magnification of the entire system. In order to keep at a predetermined position an imaging surface which moves upon change in the refracting power of the lens group B', the refracting power of the element 10 of the lens group A' is controlled. The control method of the variable refracting power element is performed by a so-called through the lens focus detection method disclosed in Japanese Patent Laid Open No. 155832/1979. For this detection method, an infrared LED 16, a collimator lens 17 for collimating light from the LED 16, a photosensor 18 having a pinhole, a half mirror 19 and a wavelength selection mirror 20 which can reflect infrared light and transmit visible light are used. Light emitted from the LED 16 is collimated by the collimator lens 17, and is radiated on an object successively through the lens groups B' and A' via the wavelength selection mirror 20. Light reflected from the object propagates the same optical path in the reverse direction, is reflected by the half mirror 19, and is incident on the photosensor 18 having a pinhole at a conjugate position. In this case, when the variable magnification optical system is in focus, an output signal from the photosensor 18 exhibits a maximum value, and otherwise, the light incident on the photosensor 18 is scattered and the output signal therefrom is decreased as compared to the in-focus state. The electromagnet 15 for moving the aperture plate 12 of the variable refracting power element 10 is controlled by the signal from an electromagnet driving circuit 21. The signal from the photosensor 18 is supplied to the electromagnet driving circuit 21. In response to this, the circuit 21 controls the electromagnet 15 to deform the shape of the surface 14 of the element 10 so that the signal from the photosensor 18 becomes maximum. In this manner, the control operation is performed so that the variable optical system is kept in the in-focus state with respect to the imaging surface.

As described above, according to the present invention, when a variable refracting power element is efficiently arranged in the system, an afocal variable magnification optical system with a simple arrangement can be obtained. The present invention can be applied to various optical systems such as a zoom telescope, a zoom expander lens, and the like.

What we claim is:

1. An afocal variable magnification optical system comprising:
    a first optical system having at least one variable refracting power element which is capable of continuously changing its refracting power;
    a second optical system, the optical axes of said first and second optical systems being common and said second optical system being spaced from said first optical system along the common optical axis; and
    said space between said first and second optical systems along the common optical axis being variable.

2. A system according to claim 1, wherein a refracting power of said second optical system is constant.

3. A system according to claim 2, wherein said first optical system is arranged at a side of an object space and has a positive refracting power, and said second optical system is arranged at a side of an image space and has a negative refracting power.

4. A system according to claim 1, wherein said variable refracting power element includes a piezoelectric member and an elastic member, and a refracting power of said variable refracting power element can be changed by changing a pressure applied on said elastic member when a voltage applied to said piezoelectric member is controlled.

5. A system according to claim 4, wherein said second optical system is movable along the optical axis relative to said first optical system, and further comprising:
    means for detecting a position of said second optical system along the optical axis so as to generate a position signal;
    driving means for applying a voltage to said piezoelectric member; and
    control means for controlling said driving means in accordance with the position signal from said detecting means so as to apply to said piezoelectric member a voltage with which said elastic member causes said first and second optical systems to have refracting powers required for said first and second optical systems to constitute an afocal system.

6. An afocal variable magnification optical system comprising:

a first optical system having at least one variable refracting power element which is capable of continuously changing its refracting power; and a second optical system having at least one variable refracting power element which is capable of continuously changing the refracting power, the optical axes of said first and second optical systems being common and said first and second optical systems being spaced a predetermined distance apart.

7. A system according to claim 6, wherein said first and second optical systems are movable along an optical axis relative to each other.

8. A system according to claim 6, wherein said first and second optical systems are fixed along an optical axis relative to each other.

9. A system according to claim 8, wherein said first optical system is arranged at a side of an object space and said second optical system is arranged at a side of an image space, and a refracting power of said second optical system is changed from a negative to positive value as a refracting power of said first optical system is changed from a positive to negative value.

10. A system according to claim 6, wherein said variable refracting power element includes a ferromagnetic member, an electromagnet and an elastic member, and a refracting power of said variable refracting power element can be changed by changing an attraction force applied to said ferromagnetic member from said electromagnet when a current supplied to said electromagnet is controlled.

11. A system according to claim 10, wherein said first and second optical systems are fixed along the optical axis relative to each other, and said further comprising:

means for detecting whether or not said variable magnification optical system constituting of said first and second optical systems are in an in-focus state so as to generate a focusing control state signal;

driving means for supplying a current to said electromagnet; and control means for controlling said driving means in accordance with the focusing control state signal from said detecting means so as to supply to said electromagnet a current with which said elastic member causes said first and second optical systems to have refracting powers sufficient for said detecting means to detect the in-focus state.

12. An afocal variable magnification optical system which is capable of continuously changing magnification, comprising:

a first optical system having at least one variable refracting power element which is capable of continuously changing its refracting power;

a second optical system, the optical axes of said first and second optical systems being common and said second optical system being spaced from said first optical system; and said space between said first and second optical systems being along the common optical axis and being variable to change the magnification of the entire system, and said refracting power of said variable refracting power element being changed to maintain the entire system afocal.

13. An afocal variable magnification optical system which is capable of continuously changing magnification, comprising:

a first optical system having at least one variable refracting power element which is capable of continuously changing its refracting power;

a second optical system having at least one variable refracting power element which is capable of continuously changing its refracting power, the optical axis of said first and second optical systems being common and said second optical system being spaced from said first optical system along the common optical axis; and said space between said first and second optical systems being along the common optical axis being variable to change the magnification of the entire system, and said refracting power of said variable refracting power elements of said first and second optical system being changed to maintain the entire system afocal.

* * * * *

UNITED STATES PATENT AND TRADEMARK OFFICE
CERTIFICATE OF CORRECTION

PATENT NO. : 4,678,899

DATED : July 7, 1987

INVENTOR(S) : Takeshi BABA, ET AL.

Page 1 of 2

It is certified that error appears in the above-identified patent and that said Letters Patent is hereby corrected as shown below:

COLUMN 2

Line 67, delete "$f'_B =$" (first occurrence).
    Line 67, "$F'_{A1}$" should read --$f'_{A1}$--.

COLUMN 3

Line 10, "mannger," should read --manner,--.
    Line 66, "abberation" should read --abberration--.

COLUMN 4

Line 11, "total" should read --focal--.

COLUMN 5

Line 17, "memebr" should read --member--.
    Line 30, "member" should read --members--.
    Line 37, "member" should read --members--.
    Line 55, "lens focus" should read --lens (TTL) focus--.
    Line 56, "Laid Open" should read --Laid-Open--.

UNITED STATES PATENT AND TRADEMARK OFFICE
CERTIFICATE OF CORRECTION

PATENT NO. : 4,678,899

DATED : July 7, 1987

INVENTOR(S) : Takeshi BABA, ET AL.

It is certified that error appears in the above-identified patent and that said Letters Patent is hereby corrected as shown below:

COLUMN 7

Line 34, delete "said".
    Line 36, delete "of".

COLUMN 8

Line 41, "system" should read --systems--.

Signed and Sealed this

Seventeenth Day of November, 1987

*Attest:*

DONALD J. QUIGG

*Attesting Officer*      *Commissioner of Patents and Trademarks*